(12) United States Patent
Rangan et al.

(10) Patent No.: US 7,869,421 B2
(45) Date of Patent: Jan. 11, 2011

(54) UPLINK ACCESS REQUEST IN AN OFDM COMMUNICATION ENVIRONMENT

(75) Inventors: Sundeep Rangan, Jersey City, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 856 days.

(21) Appl. No.: 11/486,540

(22) Filed: Jul. 14, 2006

(65) Prior Publication Data

US 2008/0013521 A1    Jan. 17, 2008

(51) Int. Cl.
     *H04J 3/08*      (2006.01)
(52) U.S. Cl. ...................................................... 370/350
(58) Field of Classification Search ................. 370/210, 370/350, 324, 445, 347, 278, 503, 491, 336, 370/509, 510, 512–514, 304, 326; 455/12.1, 455/13.1, 427, 502, 208, 450, 451, 452.1, 455/452.2, 13.2
See application file for complete search history.

(56) References Cited

U.S. PATENT DOCUMENTS

| | | | |
|---|---|---|---|
| 5,896,425 A | 4/1999 | Hirano et al. | |
| 5,909,436 A | 6/1999 | Engstrom et al. | |
| 6,487,252 B1 | 11/2002 | Kleider et al. | |
| 6,628,697 B1 * | 9/2003 | Douglas et al. | 375/139 |
| 6,922,388 B1 | 7/2005 | Laroia et al. | |
| 6,967,936 B1 | 11/2005 | Laroia et al. | |
| 7,492,785 B2 * | 2/2009 | Seligman et al. | 370/449 |
| 7,535,822 B2 | 5/2009 | Geile et al. | |
| 7,574,224 B2 * | 8/2009 | Lane et al. | 455/502 |
| 2001/0043572 A1 * | 11/2001 | Bilgic et al. | 370/281 |
| 2003/0026371 A1 | 2/2003 | Laroia et al. | |
| 2004/0037311 A1 | 2/2004 | Willes et al. | |
| 2004/0086027 A1 | 5/2004 | Shattil | |
| 2004/0184484 A1 | 9/2004 | Marchok et al. | |
| 2004/0213326 A1 | 10/2004 | Parizhsky et al. | |
| 2005/0063331 A1 | 3/2005 | Kim et al. | |
| 2005/0281239 A1 | 12/2005 | Williams | |

(Continued)

FOREIGN PATENT DOCUMENTS

WO      WO02049305      6/2002

(Continued)

OTHER PUBLICATIONS

International Search Report and Written Opinion - PCT/US07/073409, International Search Authority - European Patent Office - Jan. 10, 2008.

(Continued)

*Primary Examiner*—Melody Mehrpour
(74) *Attorney, Agent, or Firm*—Donald C. Kordich

(57) ABSTRACT

The claimed subject matter relates to acquiring channel access in a wireless communication environment. A wireless terminal may transmit first and second sets of tones over respective first and second contiguous transmission periods. The first and second tone sets may be disjoint from each other and may each comprise a number of contiguous tones. The terminal may then refrain from transmitting during a third time period in order to receive a grant signal from a base station in response to the access request. The beginnings of the first time period and the second time period may be a function of a determined uplink transmission time.

62 Claims, 10 Drawing Sheets

U.S. PATENT DOCUMENTS

2006/0062289 A1 3/2006 Hiremath et al.
2006/0233271 A1 10/2006 Savas et al.
2007/0019552 A1 1/2007 Senarath et al.

FOREIGN PATENT DOCUMENTS

WO  WO2005120182  12/2005

OTHER PUBLICATIONS

Wahlqvist M. et al.: "Time synchronization in the uplink of an OFDM system" Vehicular Technology Conference, 1996. Mobile Technology for the Human Race., IEEE 46th Atlanta, GA, USA, Apr. 28-May 1, 1996, New York, NY, USA, IEEE, US, vol. 3, pp. 1569-1573, XP010162657, ISBN: 0-7803-3157-5.

* cited by examiner

UPLINK ACCESS REQUEST IN AN OFDM COMMUNICATION ENVIRONMENT

This application contains subject matter related to co-filed U.S. patent application Ser. No. 11/486,652, entitled UPLINK TIMING CONTROL SIGNAL, filed on the same day as the present application and assigned to the assignee of the present application, the entirety of which is hereby incorporated by reference.

BACKGROUND

I. Field

The following description relates generally to communications systems, and more particularly to increasing channel acquisition capability for a wireless terminal.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

In order to communicate with a base station, a wireless device must first acquire a channel over which the communication link can be established. A wireless device entering a region served by a particular base station may transmit an access request to the base station. In certain systems it is desired that the signals transmitted from all the wireless devices to the base station are received by the base station in a synchronized manner. However, because the wireless device is new to the base station, it is likely that the wireless device is not timing synchronized with the base station. In particular, the access request signal may not be timing synchronized with the base station. An unmet need exists in the art for systems and/or methodologies that facilitate ensuring that the wireless device can achieve timing synchronization with the base station in the access process.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

According to various aspects, a method of acquiring synchronization at a wireless terminal in a wireless communication environment may comprise receiving a downlink signal from a base station, determining downlink signal timing information from the received signal, and determining an uplink transmission time for an access request signal as a function of the determined downlink timing information. The method may further comprise transmitting a first set of tones during a first time period, and transmitting a second set of tones during a second time period, wherein the beginnings of the first time period and the second time period are a function of the determined uplink transmission time.

According to another aspect, an apparatus that facilitates synchronization of a wireless terminal to a base station may comprise a receiver that receives a downlink signal from a base station, and a processor that evaluates downlink signal timing information in the received signal and identifies an uplink transmission time for an access request signal as a function of the downlink timing information. The apparatus may further comprise a transmitter that transmits a first set of tones during a first time period and a second set of tones during a second time period, wherein the beginnings of the first time period and the second time period are a function of the determined uplink transmission time.

Yet another aspect relates to an apparatus that facilitates synchronizing a wireless terminal in a wireless communication environment, comprising means for receiving a downlink signal from a base station, means for determining downlink signal timing information from the received signal, as well as means for determining an uplink transmission time for an access request signal as a function of the determined downlink timing information. The apparatus may additionally comprise means for transmitting a first set of tones during a first time period, and means for transmitting a second set of tones during a second time period, wherein the beginnings of the first time period and the second time period are a function of the determined uplink transmission time.

A further aspect relates to a computer-readable medium having stored thereon computer-readable instructions, the instructions comprising receiving a downlink signal from a base station, determining downlink signal timing information from the received signal, determining an uplink transmission time for an access request signal as a function of the determined downlink timing information, and transmitting a first set of tones during a first time period. The computer-readable medium may additionally store instructions for transmitting a second set of tones during a second time period, wherein the beginnings of the first time period and the second time period are a function of the determined uplink transmission time.

According to another aspect, a processor that executes instructions for requesting channel access in a wireless communication environment may execute instructions comprising receiving a downlink signal from a base station, and determining downlink signal timing information from the received signal. The processor may execute additional instructions for determining an uplink transmission time for an access request signal as a function of the determined downlink timing information, transmitting a first set of tones during a first time period, and for transmitting a second set of tones during a second time period, wherein the beginnings of the first time period and the second time period are a function of the determined uplink transmission time.

According to still another aspect, a method of providing channel access to a wireless terminal in a wireless communication environment may comprise receiving a first and second sets of tones during a channel acquisition time period, performing a fast-Fourier transform protocol on each received tone set to demodulate a complete access request waveform for each tone set, and transmitting a signal granting access to one or more requested channels.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
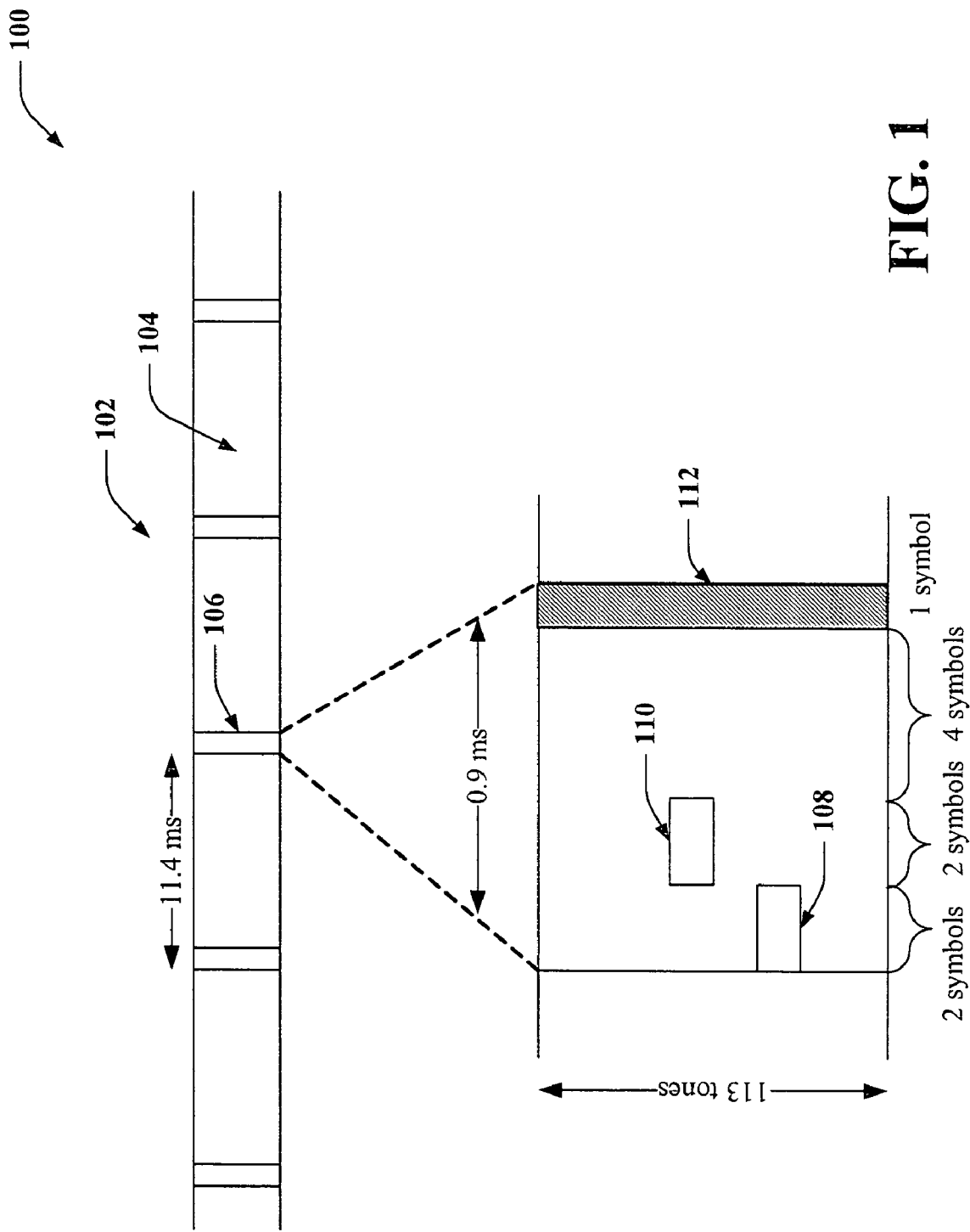
FIG. 1 illustrates a timing structure that facilitates providing a listening period for an access request transmitted by a user device and for ensuring that a base station receives a complete waveform related to the access request, in conjunction with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a user device. A user device can also be called a system, a subscriber unit, subscriber station, mobile station, mobile device, remote station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Various aspects described herein relate to maximizing the allowable unknown ambiguity of the round-trip delay that a wireless device (e.g., an access terminal, a user device, a cell phone, a PDA, . . . ) may have when the device desires to access a base station, while allowing the base station to easily detect the presence and the arrival time of the access signal so that the base station can correct the timing of the wireless device and make the wireless device to be timing synchronized. For instance, multiple tone sets may be transmitted according to a predetermined timing scheme that permits a base station to receive a complete waveform and thereby relatively easily detect an access request. For example a portion of 113 tones in a given symbol period may be divided into subsets, each comprising 8 or 16 tones. A first set of tones may be transmitted during a first time period (e.g., one or more symbols), and a second set of tones may be transmitted during a second time period from an access terminal to indicate an access request. The first and the second sets are different, in the sense that there is at least one tone, which is a member of the first set but is not a member of the second set. According to an aspect, the two sets are disjoint, in the sense that none of the tones in the first set is a member of the second set, and vice versa.

For the purpose of frequency diversity, it may be desired that the first set of tones and the second set of tones are sufficiently separate in frequency. In some aspects, the first set and the second set are related to each other according to a predetermined fixed mapping function. The tone sets may be received at a base station (e.g., after some propagation delay), and demodulated for analysis. Tones not utilized for the access request during a given time period may be utilized for other purposes (e.g., data transmission or the like).

Various examples are described herein to facilitate understanding of the various aspects and/or embodiments of the subject innovation. As used herein, "exemplary" and other such terms are intended to be interpreted as relating to an example, and not to be interpreted as "preferred" or some other such meaning. Rather the various illustrations and/or examples described herein are provided for illustrative purposes, and it is to be appreciated that the subject innovation is not intended to be limited to such examples, but may extend to other applications as well.

FIG. 1 illustrates a system 100 that facilitates providing an increased listening period for an access request transmitted by a user device and for ensuring that a base station receives a complete waveform related to the access request, in conjunction with various aspects. As illustrated, an ultraframe 102 comprises a plurality of superframes 104, each of which has a duration of approximately 11.4 milliseconds. At or near the beginning of each superframe 104 is an acquisition period 106 (e.g., an uplink access channel), which may be approximately 9 symbols in length, or approximately 0.9 milliseconds. A total of 113 tones, or subcarriers, may be transmitted during a given symbol, and the total or a portion of those 113 tones, e.g., 112 tones, may be divided into subgroups, each comprising a predetermined number (e.g., 8, 16, etc.) of tones. An access terminal may transmit an access signal, which includes a first set of tones 108 during a first time period and a second set of tones 110 during a second time period. The access signal may be utilized to carry a waveform related to an access request to an access point serving the area. For example, first and second sets of tones 108 and 110 and may be sets of 8 tones and may be distinct from each other. The first and second time periods may be approximately 2 symbols in length, and may also be distinct from each other. Moreover, the first and second time periods may be contiguous in time.

Thus, to further this example and as depicted in FIG. 1, the first set of 8 tones 108 may be transmitted during a first two-symbol period and the second set of 8 tones 110 may be transmitted during a second 2-symbol period. The first and second sets are transmitted from an access terminal during the first 4 symbols of the 9-symbol acquisition period 106. The next 4 symbols of acquisition period 106 are left empty to accommodate the ambiguity of unknown round-trip delay that the wireless device may have and to minimize or prevent interference between the access signal and the other signals in the system. For example, the last symbol 112 of the 9-symbol acquisition period 106 is used to transmit timing synchronized signals by the wireless devices that have already been connected and timing synchronized with the base station.

The following discussion relates to the uplink access channel, UL.ACH, and acquisition thereof, and is intended to facilitate understanding of the various aspects presented herein. The UL.ACH channel may make exclusive use of OFDM symbols having a UL superslot OFDM symbol index of 0:8 in any superslot, and may be divided into three subchannels. The UL.ACH.AR subchannel may be utilized to transmit access request signals, such as the two 8-tone signals described above. The UL.ACH.PA subchannel may be utilized to send an acknowledgement to a downlink paging channel (DL.PCH), and the UL.ACH.TC subchannel may be employed to send timing control signals. Tone indexing may be performed on a post-hop basis, where a base tone is predefined as a zero-tone (0-tone). Thus, the index of a tone corresponds directly to the physical frequency location of the tone. The set of OFDM symbols having a UL superslot OFDM symbol index of 0:8 may be referred to as the ULACH interval, which may be utilized such that UL.ACH.AR and UL.ACH.PA may be employed during symbols 0:3 and UL.ACH.TC may be employed during symbol 8, while symbols 4:7 remain reserved (e.g., no signal is transmitted during the fourth through the seventh symbols of the UL access channel).

The UL.ACH.AR subchannel may be utilized to send random access signals, and there are 6 UL.ACH.AR segments in a UL.ACH interval. In order to define channel segments, a plurality of tone sets may be defined, as seen in Table 1, below. A UL.ACH tone segment may comprise tone-symbols with tones of certain tone sets over certain numbers of OFDM symbols, and may be specified with the indices of the tone sets and the indices of the OFDM symbol during which the segments occupies the tone sets. Accordingly, Table 1 describes an example of tone sets that may be utilized in the UL.ACH.AR and UL.ACH.PA subchannels. Note that in the example of Table 1, each tone set comprises 8 contiguous tones.

TABLE 1

| Index of tone set | Indexes of tones of a tone set |
|---|---|
| 0 | 0:7 |
| 1 | 8:15 |
| 2 | 16:23 |
| 3 | 24:31 |
| 4 | 32:39 |
| 5 | 40:47 |
| 6 | 48:55 |
| 7 | 56:63 |
| 8 | 64:71 |
| 9 | 72:79 |
| 10 | 80:87 |
| 11 | 88:95 |
| 12 | 96:103 |
| 13 | 104:111 |

Table 2 describes an example of channel segments that may be utilized for UL.ACH.AR.

TABLE 2

| Index of UL.ACH.AR segments | Index of tone sets | ulSuperslotOFDM Symbol Index |
|---|---|---|
| Segment [0] | 0 | 0:1 |
|  | 7 | 2:3 |
| Segment [1] | 1 | 0:1 |
|  | 8 | 2:3 |
| Segment [2] | 2 | 0:1 |
|  | 9 | 2:3 |
| Segment [3] | 3 | 0:1 |
|  | 10 | 2:3 |
| Segment [4] | 4 | 0:1 |
|  | 11 | 2:3 |
| Segment [5] | 5 | 0:1 |
|  | 12 | 2:3 |

The UL.ACH.PA subchannel may be utilized, for example, to send a paging acknowledgment to the DL.PCH, and there is 1 UL.ACH.PA segment in a UL.ACH interval. Examples of channel segment definitions are set forth below, in Table 3.

TABLE 3

| Index of UL.ACH.PA segments | Index of tone sets | ulSuperslotOFDM Symbol Index |
|---|---|---|
| Segment [0] | 6 | 0:1 |
|  | 13 | 2:3 |

Figure 2:
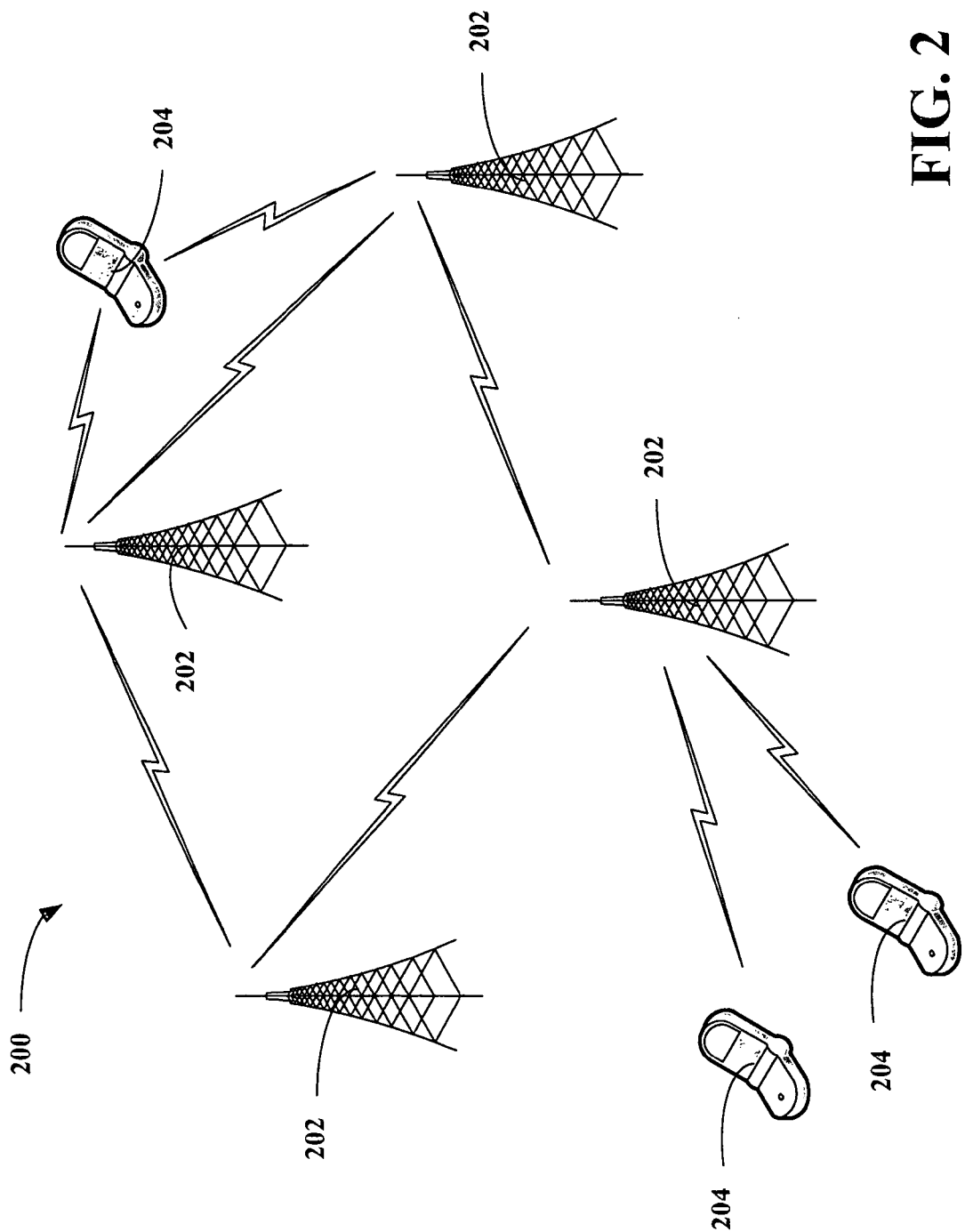
FIG. 2 is an illustration of a wireless communication system.

Note that in the examples shown in Table 2 and Table 3, each segment comprises a first set of 8 contiguous tones in the first two symbol periods, and a second set of 8 contiguous tones in the second two symbol periods. The first and the second sets are disjoint and related with each one in a fixed manner. The first and the second sets are chosen to maximize frequency diversity of the access signal. In a UL.ACH.AR segment and/or in a UL.ACH.PA segment, OFDM symbols having a UL superslot OFDM symbol index of 0 or 2 may be deemed "primary" OFDM symbols, and OFDM symbols with an index of 1 or 3 may be deemed "extension" OFDM symbols for the symbols with indices of 0 or 2, respectively. Primary symbols may be constructed such that they do not contain any information specific to the access terminal from which they are transmitted. Modulation symbols in the segment may be set to (1,1), and the access terminal may execute segment construction in accordance with various protocols and/or techniques. An extension OFDM symbol may be constructed as a cyclic extension of a corresponding primary OFDM symbol. For instance, consider an OFDM system using 128-point IFFT and 16-point cyclic prefix. The total number of samples in one OFDM symbol is 128+16=144. At the access terminal, let $V4_0$, $V4_1$ to be the time-domain sample vectors for the primary symbol and its extension symbol respectively. $V4_0$ may be calculated by modulating symbols (1,1) onto the corresponding tones of the segment and containing no access terminal-specific information. Given $V4_0$, $V4_1$ may be constructed such that:

For (k=0;k,128;k++) $V4_1[k]=V4_0[k+16]$; for (k=128;k<144;k++) $V4_1[k]=V4_1[k-128]$;

Referring now to FIG. 2, an example wireless communication system 200 is illustrated. System 200 can include one or more base stations 202 in one or more sectors that receive, transmit, repeat, etc., wireless communication signals to each other and/or to one or more mobile devices 204. A base station may be a fixed station used for communicating with terminals and may also be referred to as an access point, a Node B, or other terminology. Each base station 202 can comprise a transmitter chain and a receiver chain, each of which can in turn comprise a plurality of components associated with signal transmission and reception (e.g., processors, modulators, multiplexers, demodulators, demultiplexers, antennas, . . . ), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless system 200. In addition, each mobile device 204 can comprise one or more transmitter chains and receiver chains, such as used for a multiple input multiple output (MIMO) system. Each transmitter and receiver chain can include a plurality of components associated with signal transmission and reception (e.g., processors, modulators, multiplexers, demodulators, demultiplexers, antennas, . . . ), as will be appreciated by one skilled in the art. Each mobile device 204 may transmit first and second tone sets during first and second time periods to permit a base station 202 to detect an access request and grant access to the requesting mobile device 204.

Figure 3:
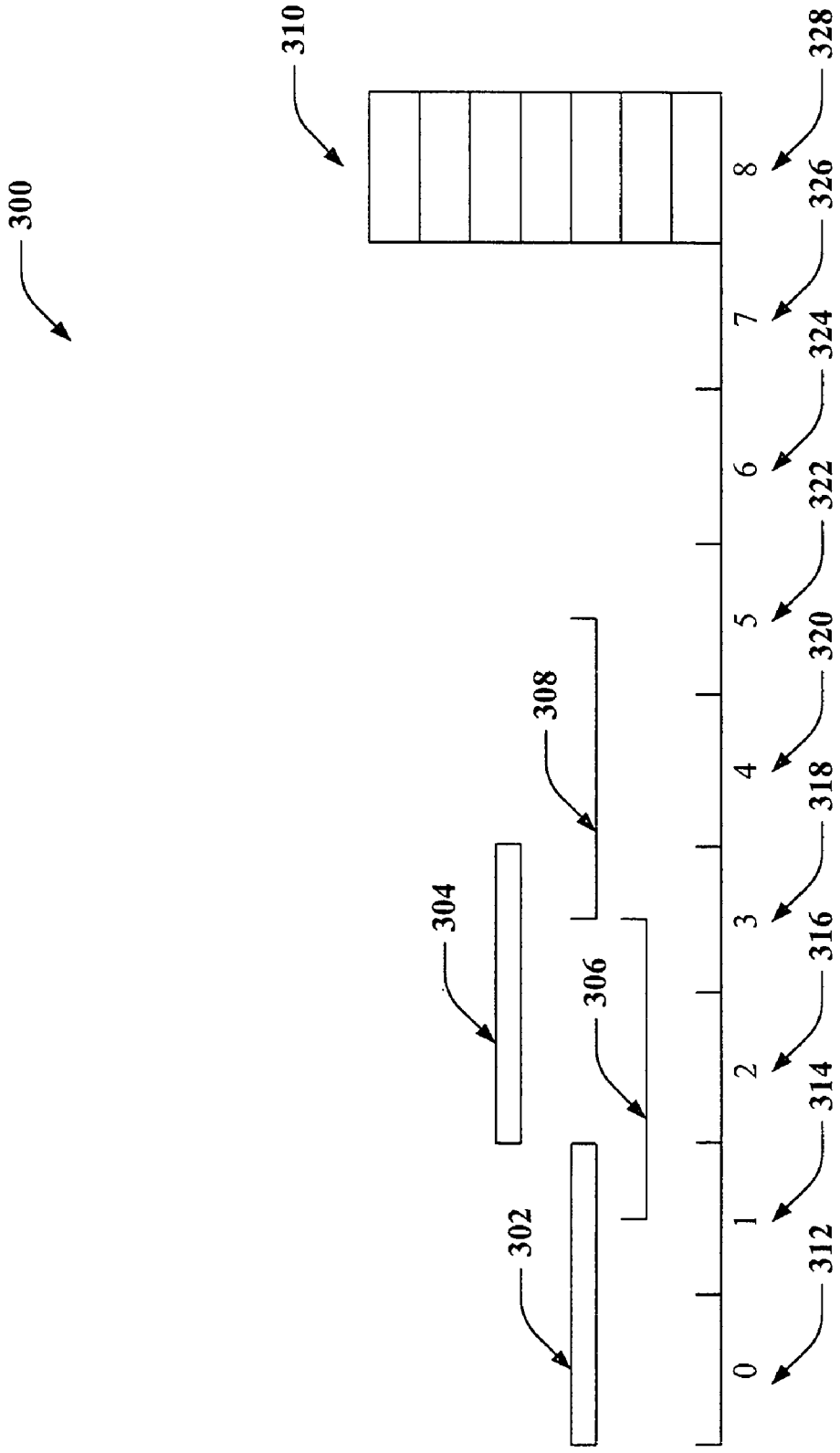
FIG. 3 is an illustration of the effect of unknown round-trip propagation delay on the reception of the access signal at the base station receiver.

FIG. 3 is an illustration of the effect of unknown round-trip propagation delay on the reception of the access signal at the base station receiver. The axis represents the time. FIG. 3 shows a 9-symbol UL.ACH interval at the base station receiver. The interval comprises symbol 0 (312), symbol 1 (314), . . . , and symbol 8 (328). Symbol 8 is used for the wireless devices that have connected to the base station to send timing control signals. Symbols 0 to 7 are used for new wireless devices to access the base station.

In an exemplary OFDM system, it is desired that the uplink signals from the wireless devices to be synchronized with the receiver symbol timing at the base station. However, a new wireless device is may not be timing synchronized with the base station receiver. According to an aspect, a new wireless device receives the downlink signal, e.g., pilot signal, from the base station, and derives the downlink symbol timing from the received signal. The wireless device further determines uplink symbol timing for the access signal based on the derived downlink symbol timing. Note that the uplink symbol timing determined by the wireless device may be offset from the target symbol timing at the base station by an amount approximately equal to the round trip delay between the base station and the wireless device.

In the example shown in FIG. 3, suppose that the wireless device is very close to the base station. Therefore, the access signal sent by the wireless device, which comprises a first tone set 302 and a second tone set 304, arrives at the base station receiver at the beginning of the UL.ACH interval. On the other hand, suppose that the wireless device is in the middle of the cell. As a result, the access signal sent by the wireless device arrives at the base station receiver in time intervals 306 and 308. The time offset in the two scenarios is approximately equal to the difference in the round-trip delay.

If the wireless device is at the edge of the cell, then the access signal sent by the wireless device will be further delayed to arrive at the base station receiver. In order to prevent the delayed access signal from interfering with symbol 8, which is used for other signals, the wireless device may remain silent for some period of time after the access signal has been transmitted. According to an aspect, the wireless device may remain silent for at least 4 symbol periods. As a result, the maximum allowed round-trip delay is equal to 4 symbol periods. The maximum allowed round-trip delay is an important factor for the design of the cell size.

Figure 4:
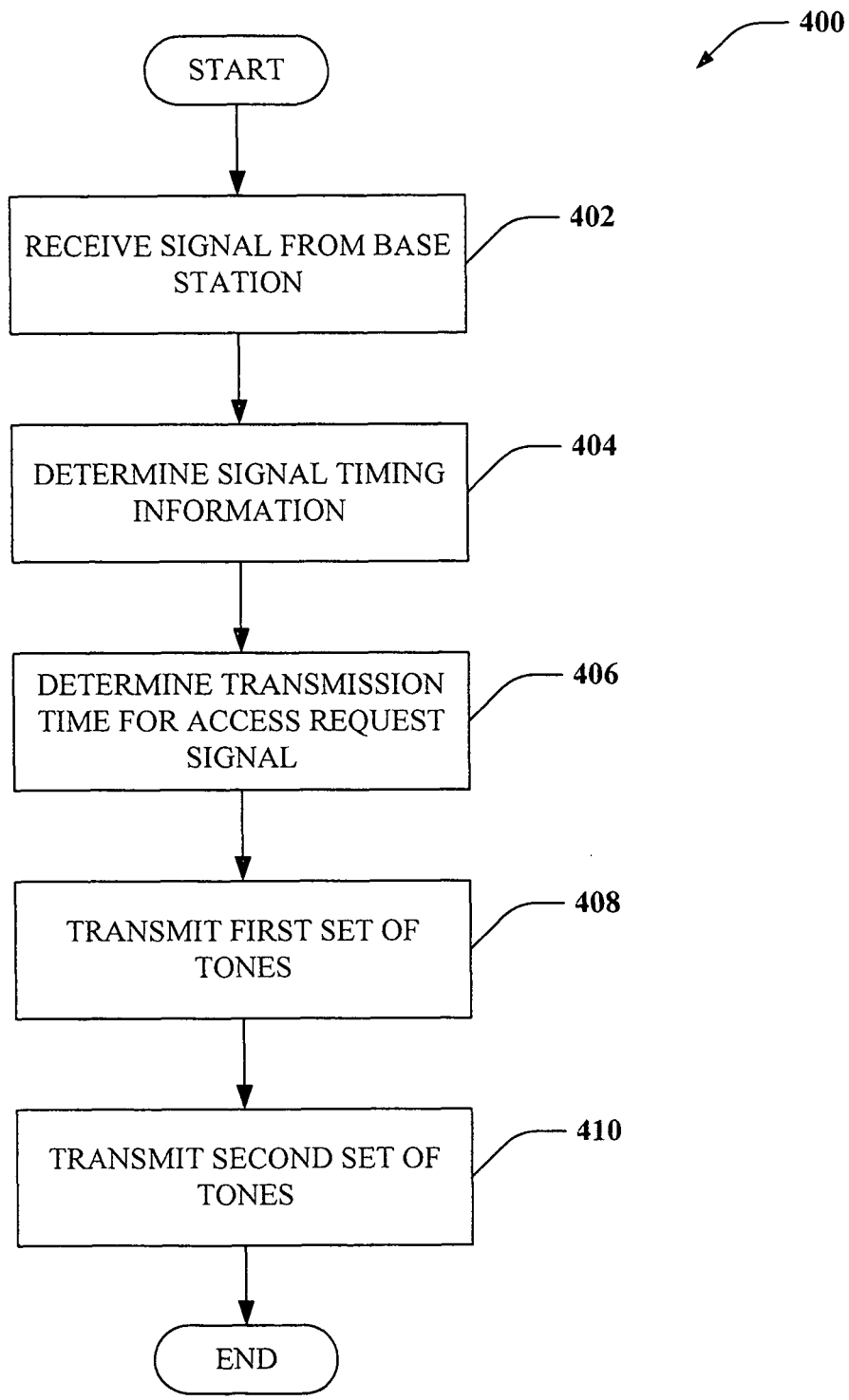
FIG. 4 is an illustration of a methodology for acquiring access for communication between a wireless communication device and a base station, in accordance with one or more aspects.
Figure 5:
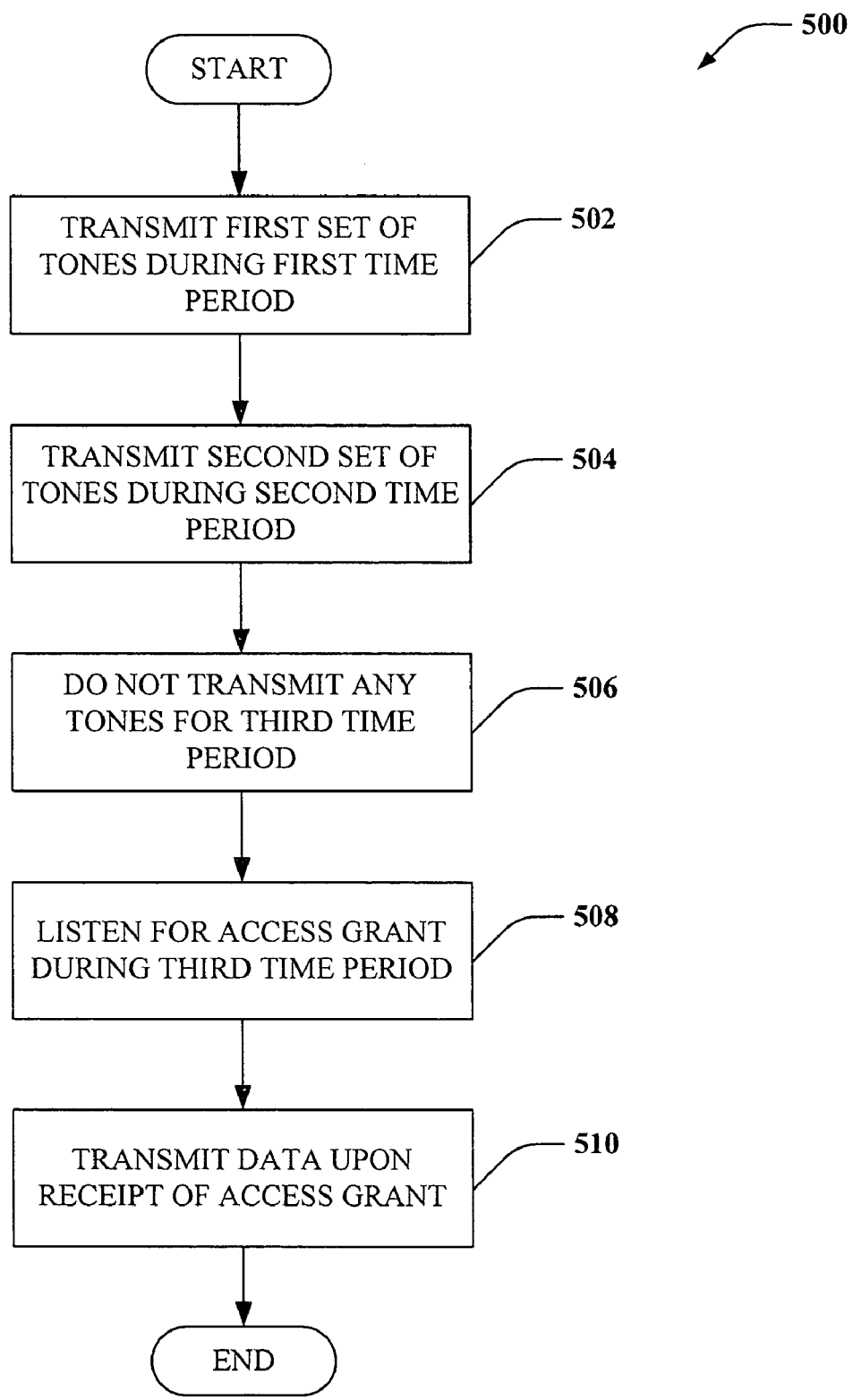
FIG. 5 is an illustration of a methodology for increasing access grant detection range for a wireless device in a communication environment, in accordance with one or more aspects.

Referring to FIGS. 4-5, methodologies relating to improving channel acquisition for a wireless terminal are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

FIG. 4 is an illustration of a methodology 400 for acquiring access for communication between a wireless communication device and a base station, in accordance with one or more aspects. At 402, a wireless device (e.g., an access terminal, a cell phone, a PDA, etc.) may receive a signal from a base station serving a region in which the wireless device is located. The wireless device may analyze the signal at 404 to evaluate signal timing information and the like for signal transmission to the base station. At 406, the wireless device may determine a transmission time during which to transmit an access request signal to the base station. The determination at 406 may be based at least in part on timing information gleaned from the signal received at 402. At 408 the wireless device may transmit a first set of tones during a first portion of the access request signal transmission period. The wireless device may then transmit a second set of tones during a second portion of the transmission period. Each set of tones may comprise, for example 8 tones, where the first set of tones is transmitted over a first two-symbol period and the second set of tones is transmitted over a second two-symbol period. Additionally, the two-symbol periods during which the first and second sets of tones are transmitted may be contiguous such that they collectively span a four-symbol-long period.

According to an example, a total of 113 tones may be available for transmission during any given symbol period, and may be divided into 14 subgroups of 8 tones each (e.g., 0-7, 8-15, and so on). A first set of 8 tones may be selected from the first tone subset (e.g., tones 0-7) for transmission during the first two-symbol transmission period, at 408. To further this example, a second set of 8 tones (e.g., tones 56-63) may be selected for transmission during the second two-symbol transmission period, at 410. In this manner, a base station that receives a tone set during a first symbol (e.g., after some propagation delay) and begins demodulation thereof is ensured to receive a complete one symbol period of an OFDM symbol waveform of the access signal in at least one of 8 receiver symbol windows (e.g., 312, 314, . . . , 326), even though the arrived access signal is not timing synchronized with the base station receiver. Advantageously, the base station receiver does not have to shift its symbol window for a fractional symbol period in order to detect the access signal and its arrival timing. The base station receiver can shift its symbol window for a fractional symbol period to improve detection quality.

FIG. 5 is an illustration of a methodology 500 for increasing access grant detection range for a wireless device in a communication environment, in accordance with one or more aspects. At 502, a first set of tones may be transmitted from the wireless device during a first time period. At 504 a second set of tones may be transmitted during a second time period. The first and second tone sets may comprise, for example 8 tones per set, or any other suitable number of tones, and may carry a waveform comprising information related to a request for access to one or more communication channels. The time period for transmitting each respective tone set may be one symbol period, two symbol periods, or any other suitable transmission time period. At 506, the wireless device may remain silent (e.g., refrain from transmitting) for a third time period, which may comprise, for example 4 symbol periods or some other suitable duration. By remaining silent at 506, the wireless device does not cause interference to other uplink signals, e.g., signals sent by other wireless terminals already connected with the base station. The wireless device may listen for an access grant signal, at 508, during the third time period as well as a subsequent time period. At 510, the wireless device may resume transmission. For instance, if an access grant signal has been received, then the wireless device may adjust its transmitter symbol timing based on the information provided in the access grant signal, and begin to transmit data over granted channels at 510. If access has been denied or not grant has been received, then the wireless device may reiterate an access request by retransmitting the same or different sets of tones during a next acquisition period.

Figure 6:
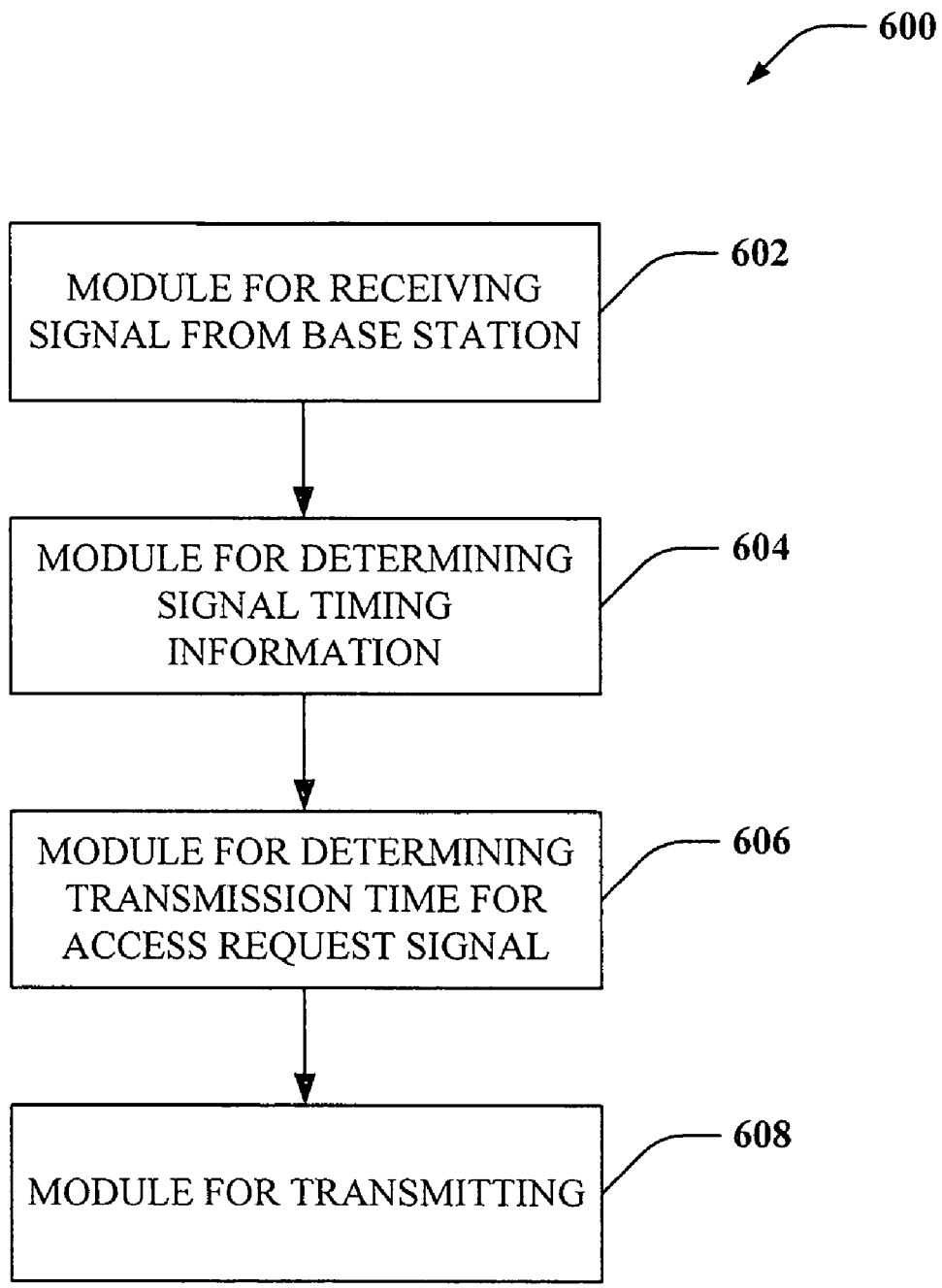
FIG. 6 illustrates a system that facilitates enhancing channel acquisition for a wireless device in a communication environment, in accordance with one or more aspects described herein.

FIG. 6 illustrates a system 600 that facilitates enhancing channel acquisition for a wireless device in a communication environment, in accordance with one or more aspects described herein. System 600 is represented as a series of interrelated functional blocks, which can represent functions implemented by a processor, software, or combination thereof (e.g., firmware). System 600 comprises a module for receiving 602 that receives a signal from a base station, which may be a beacon signal, a data signal, or any other suitable type of signal to indicate the base station's presence, location, and/or capability to the wireless device. System 600 also comprises a module for determining signal timing information 604 from the received signal. A module for determining a transmission time 606 may evaluate the signal timing information and identify a time at which an access request signal is to be transmitted from the device to the base station. Once the transmission time has been identified, a module for transmitting 608 may transmit a first set of access request tones during a first portion of the transmission time (e.g., a two-symbol portion or some other suitable duration). A module for transmitting 608 may transmit a second set of access request tones during a second portion of the transmission period (e.g., a second two-symbol portion or some other suitable duration), which may be contiguous to the first portion of the transmission period. Once the access request tone sets have been transmitted, a module for transmitting 608 may remain silent during a third portion of the transmission period to prevent interference with other uplink signals due to the unknown round-trip delay.

Figure 7:
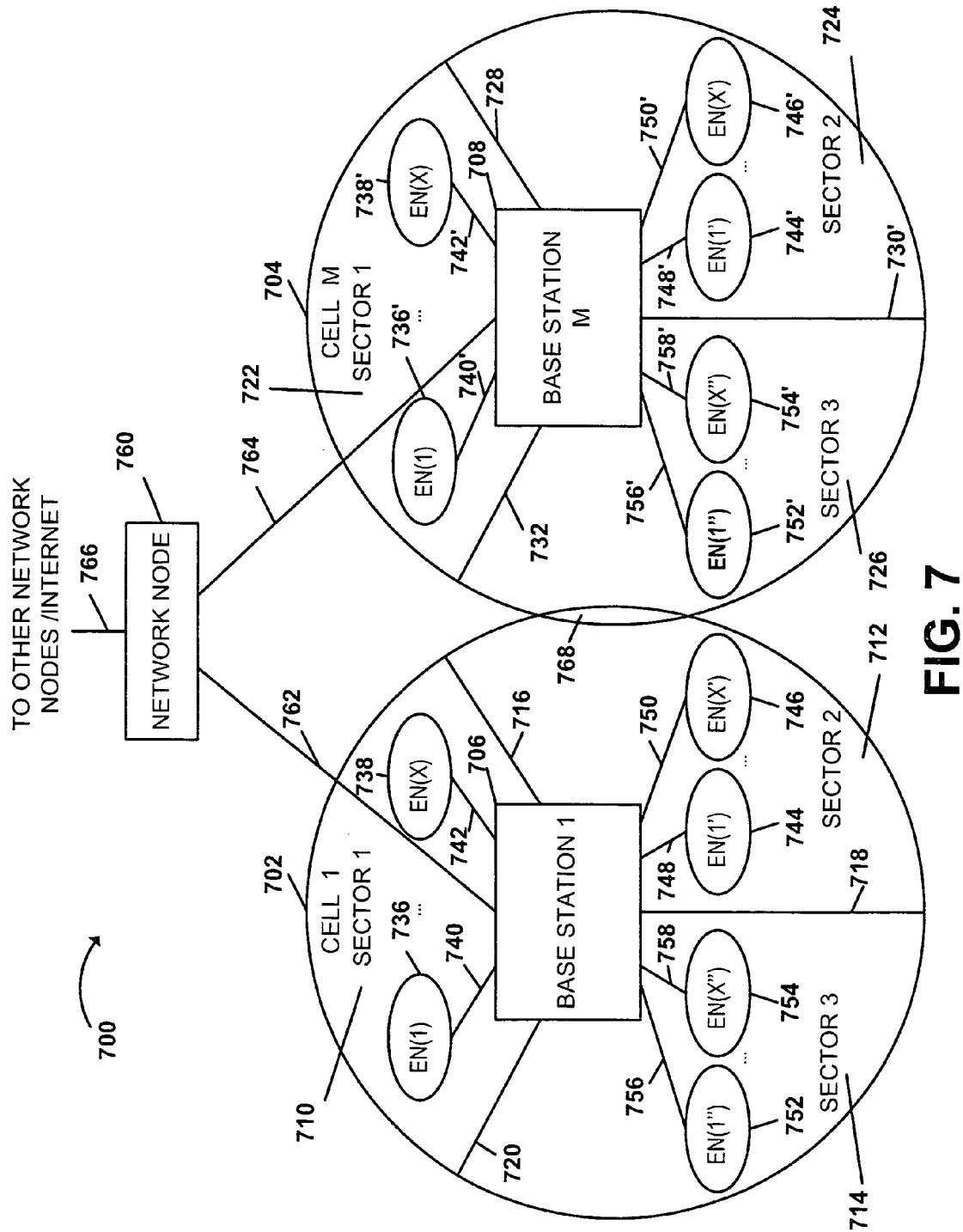
FIG. 7 illustrates a network diagram of an exemplary communications system implemented in accordance with the present invention.

FIG. 7 shows an exemplary communication system 700 implemented in accordance with the present invention including multiple cells: cell 1 702, cell M 704. Note that neighboring cells 702, 704 overlap slightly, as indicated by cell boundary region 768, thereby providing the potential for signal interference between signals being transmitted by base stations in neighboring cells. Each cell 702, 704 of exemplary system 700 includes three sectors. Cells which have not be subdivided into multiple sectors (N=1), cells with two sectors (N=2) and cells with more than 3 sectors (N>3) are also possible in accordance with the invention. Cell 702 includes a first sector, sector 1 710, a second sector, sector 2 712, and a third sector, sector 3 714. Each sector 710, 712, 714 has two sector boundary regions; each boundary region is shared between two adjacent sectors. Sector boundary regions provide the potential for signal interference between signals being transmitted by base stations in neighboring sectors. Line 716 represents a sector boundary region between sector 1 710 and sector 2 712; line 718 represents a sector boundary region between sector 2 712 and sector 3 714; line 720 represents a sector boundary region between sector 3 714 and sector 1 710. Similarly, cell M 704 includes a first sector, sector 1 722, a second sector, sector 2 724, and a third sector, sector 3 726. Line 728 represents a sector boundary region between sector 1 722 and sector 2 724; line 730 represents a sector boundary region between sector 2 724 and sector 3 726; line 732 represents a boundary region between sector 3 726 and sector 1 722. Cell 1 702 includes a base station (BS), base station 1 706, and a plurality of end nodes (ENs) in each sector 710, 712, 714. Sector 1 710 includes EN(1) 736 and EN(X) 738 coupled to BS 706 via wireless links 740, 742, respectively; sector 2 712 includes EN(1') 744 and EN(X') 746 coupled to BS 706 via wireless links 748, 750, respectively; sector 3 726 includes EN(1") 752 and EN(X") 754 coupled to BS 706 via wireless links 756, 758, respectively. Similarly, cell M 704 includes base station M 708, and a plurality of end nodes (ENs) in each sector 722, 724, 726. Sector 1 722 includes EN(1) 736' and EN(X) 738' coupled to BS M 708 via wireless links 740', 742', respectively; sector 2 724 includes EN(1') 744' and EN(X') 746' coupled to BS M 708 via wireless links 748', 850', respectively; sector 3 826 includes EN(1") 852' and EN(X") 854' coupled to BS 808 via wireless links 756', 758', respectively. System 700 also includes a network node 760 which is coupled to BS1 706 and BS M 708 via network links 762, 764, respectively. Network node 760 is also coupled to other network nodes, e.g., other base stations, AAA server nodes, intermediate nodes, routers, etc. and the Internet via network link 766. Network links 762, 764, 766 may be, e.g., fiber optic cables. Each end node, e.g. EN 1 736 may be a wireless terminal including a transmitter as well as a receiver. The wireless terminals, e.g., EN(1) 736 may move through system 700 and may communicate via wireless links with the base station in the cell in which the EN is currently located. The wireless terminals, (WTs), e.g. EN(1) 736, may communicate with peer nodes, e.g., other WTs in system 700 or outside system 700 via a base station, e.g. BS 706, and/or network node 760. WTs, e.g., EN(1) 736 may be mobile communications devices such as cell phones, personal data assistants with wireless modems, etc. Each base station performs tone subset allocation using a different method for the strip-symbol periods in accordance with the invention, from the method employed for allocating tones and determining tone hopping in the rest symbol periods, e.g., non strip-symbol periods. The wireless terminals use the tone subset allocation method of the present invention along with information received from the base station, e.g., base station slope ID, sector ID information, to determine the tones that they can use to receive data and information at specific strip-symbol periods. The tone subset allocation sequence is constructed, in accordance with the invention to spread the inter-sector and inter-cell interference across each of the tones.

Figure 8:
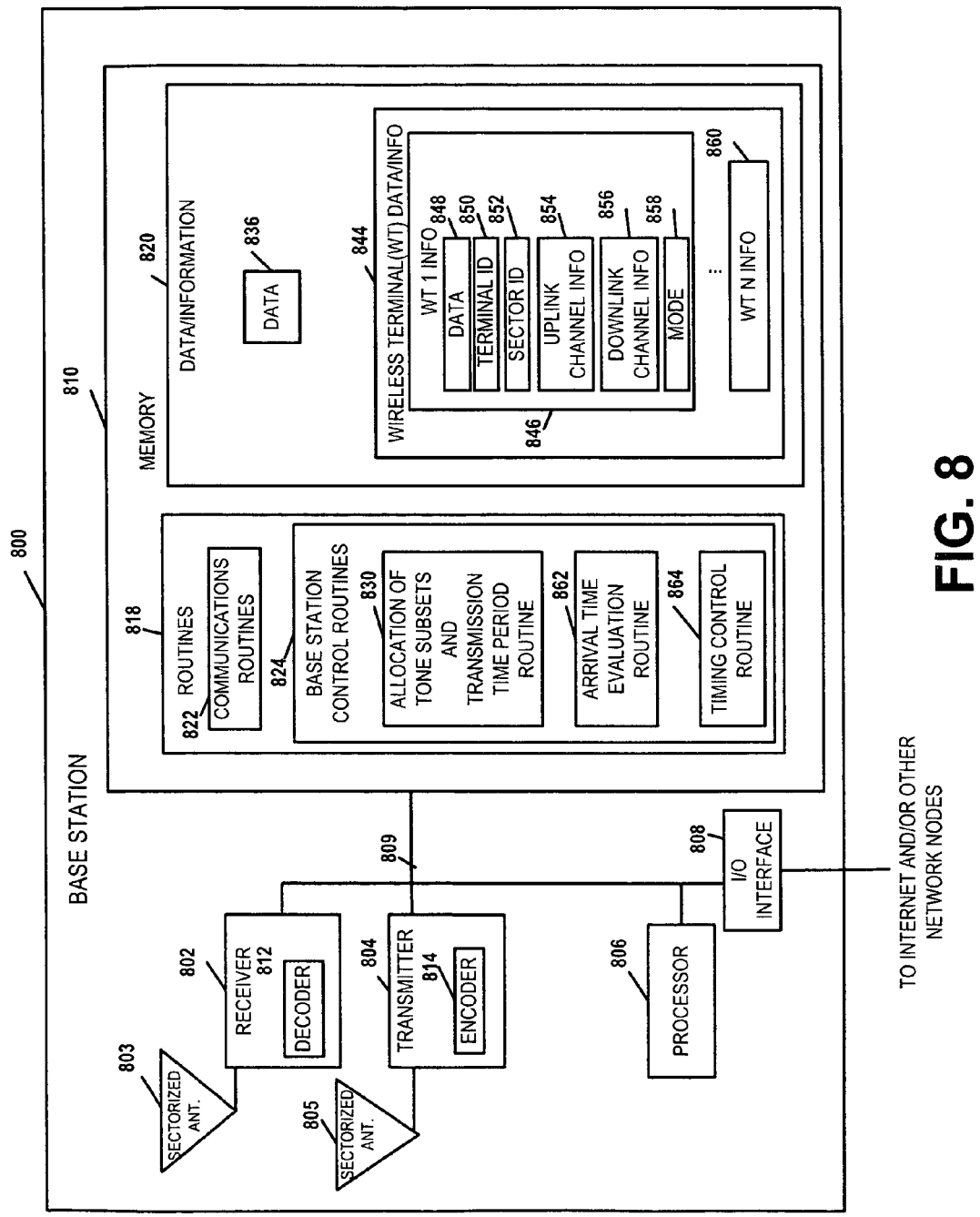
FIG. 8 illustrates an exemplary base station implemented in accordance with the present invention.

FIG. 8 illustrates an exemplary base station 800 in accordance with the present invention. Exemplary base station 800 implements the tone subset allocation sequences of the present invention, with different tone subset allocation sequences generated for each different sector type of the cell. The base station 800 may be used as any one of the base stations 806, 808 of the system 800 of FIG. 8. The base station 800 includes a receiver 802, a transmitter 804, a processor 806, e.g., CPU, an input/output interface 808 and memory 810 which are coupled together by a bus 809 over which the various elements 802, 804, 806, 808, and 810 may interchange data and information.

Sectorized antenna 803 coupled to receiver 802 is used for receiving data and other signals, e.g., channel reports, from wireless terminals transmissions from each sector within the base station's cell. Sectorized antenna 805 coupled to transmitter 804 is used for transmitting data and other signals, e.g., control signals, pilot signal, beacon signals, etc. to wireless terminals 900 (see FIG. 10) within each sector of the base station's cell. In various embodiments of the invention, base station 800 may employ multiple receivers 802 and multiple transmitters 804, e.g., an individual receivers 802 for each sector and an individual transmitter 804 for each sector. The processor 806, may be, e.g., a general purpose central processing unit (CPU). Processor 806 controls operation of the base station 800 under direction of one or more routines 818 stored in memory 810 and implements the methods of the present invention. I/O interface 808 provides a connection to other network nodes, coupling the BS 800 to other base stations, access routers, AAA server nodes, etc., other networks, and the Internet. Memory 810 includes routines 818 and data/information 820.

Data/information 820 includes data 836, and wireless terminal (WT) data/info 844 including a plurality of sets of WT information: WT 1 info 846 and WT N info 860. Each set of WT info, e.g., WT 1 info 846 includes data 848, terminal ID 850, sector ID 852, uplink channel information 854, downlink channel information 856, and mode information 858.

Routines 818 include communications routines 822 and base station control routines 824. Base station control routines 824 include an allocation of tone subsets and transmission time period routine 830 for the strip-symbol periods, which may assign tone sets to one or more wireless terminals. For instance, processor 806 may implement allocation of tone subsets and transmission time period routine 830 to assign a tone sets and/or subsets as set forth above with regard to preceding figures. Receiver 802 may receive a signal comprising information related to the assigned tone subsets, upon which processor 806 may implement an arrival-time evaluation routine 862 that determines an arrival time of the signal and compares the determined arrival time to an and expected arrival time period for the signal. Based on the comparison, a timing control routine 864 may be implemented to generate a timing control command instructing the terminal to adjust its transmission time to synchronize the terminal with the base station. The timing control command may then be transmitted by transmitter 804.

Data 836 includes data to be transmitted that will be sent to encoder 814 of transmitter 804 for encoding prior to transmission to WTs, and received data from WTs that has been processed through decoder 812 of receiver 802 following reception.

Data 848 may include data that WT1 900 has received from a peer node, data that WT 1 900 desires to be transmitted to a peer node, and downlink channel quality report feedback information. Terminal ID 850 is a base station 800 assigned ID that identifies WT 1 900. Sector ID 852 includes information identifying the sector in which WT1 900 is operating. Sector ID 852 can be used, for example, to determine the sector type. Uplink channel information 854 includes information identifying channel segments 8 for WT1 900 to use, e.g., uplink traffic channel segments for data, dedicated uplink control channels for requests, power control, timing control, etc. Each uplink channel assigned to WT1 900 includes one or more logical tones, each logical tone following an uplink hopping sequence in accordance with the present invention. Downlink channel information 856 includes information identifying channel segments 8 to carry data and/or information to WT1 900, e.g., downlink traffic channel segments for user data. Each downlink channel assigned to WT1 900 includes one or more logical tones, each following a downlink hopping sequence. Mode information 858 includes information identifying the state of operation of WT1 900, e.g. sleep, hold, on.

Communications routines 822 control the base station 800 to perform various communications operations and implement various communications protocols. Base station control routines 824 are used to control the base station 800 to perform basic base station functional tasks, e.g., signal generation and reception, scheduling, and to implement the steps of the method of the present invention including transmitting signals to wireless terminals using the tone subset allocation sequences of the present invention during the strip-symbol periods.

Allocation of tone subsets and transmission time period routine 830 constructs the tone subset to be used in a strip-symbol period in accordance with the present invention using the method of the present invention and data/info 820 including sector ID 852. The downlink tone subset allocation sequences will be different for each sector type in a cell and different for adjacent cells. The WTs 900 receive the signals in the strip-symbol periods in accordance with the downlink tone subset allocation sequences; the base station 800 uses the same downlink tone subset allocation sequences in order to generate the transmitted signals.

Figure 9:
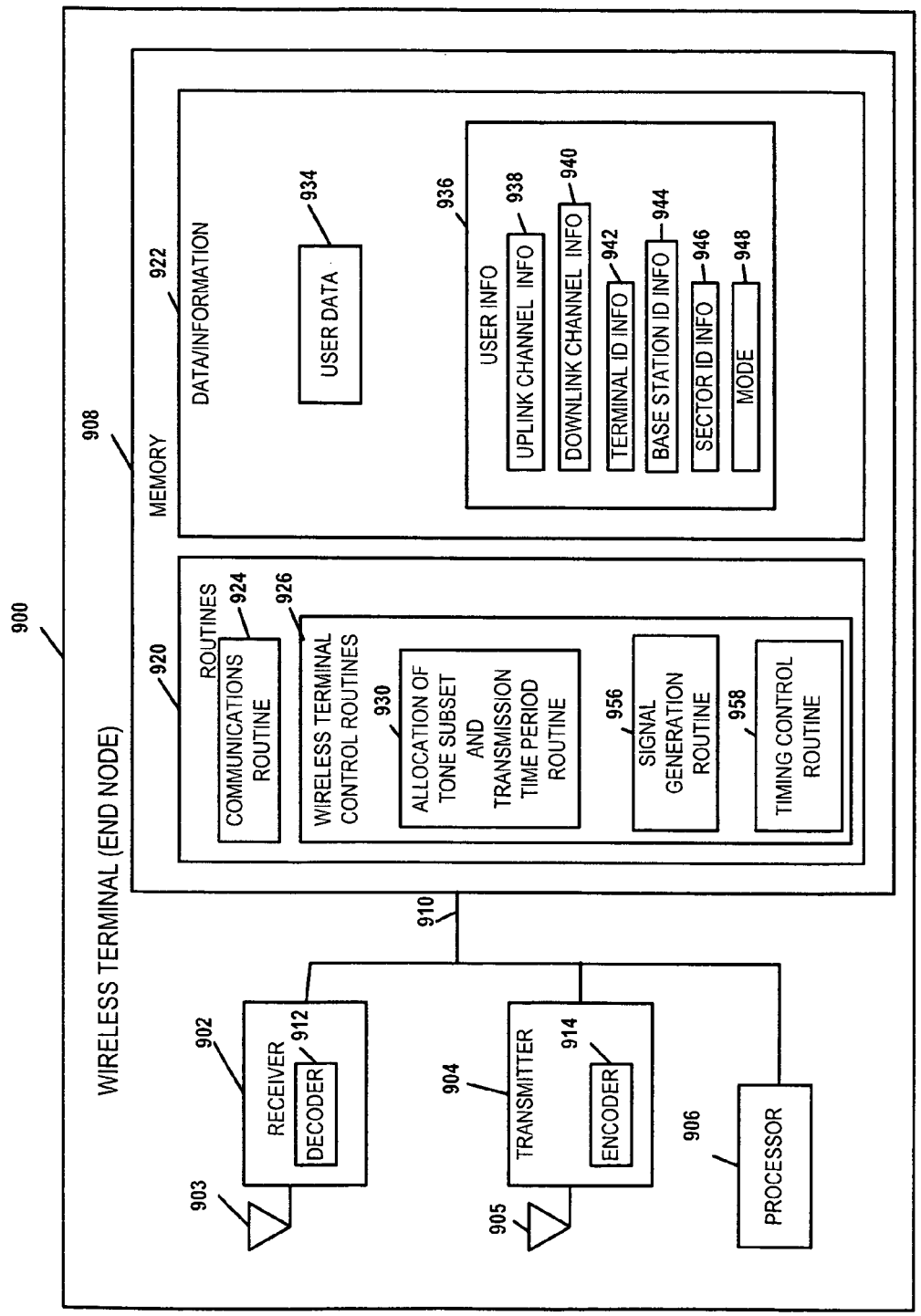
FIG. 9 illustrates an exemplary wireless terminal implemented in accordance with the present invention.

FIG. 9 illustrates an exemplary wireless terminal (end node) 900 which can be used as any one of the wireless terminals (end nodes), e.g., EN(1) 736, of the system 700 shown in FIG. 7. Wireless terminal 900 implements the tone subset allocation sequences, in accordance with the present invention. The wireless terminal 900 includes a receiver 902 including a decoder 912, a transmitter 904 including an encoder 914, a processor 906, and memory 908 which are coupled together by a bus 910 over which the various elements 902, 904, 906, 908 can interchange data and information. An antenna 903 used for receiving signals from a base station 706 is coupled to receiver 902. An antenna 905 used for transmitting signals, e.g., to base station 706 is coupled to transmitter 904.

According to various aspects, receiver 902 may receive a plurality of resource assignments from a base station.

Receiver 902 may additionally receive a transmission time period assignment, during which the terminal 900 may transmit a signal related to the two subsets of tones. In some aspects, the assignment of tone sets and transmission time periods may be implicitly given by the MAC identifier of the wireless terminal, in which case, the wireless terminal receives the assignment of the MAC identifier and then derives the assigned tone sets and transmission time periods from the received MAC identifier. For instance, processor 906 may implement a signal generation routine 956 that generates a signal comprising information related to the assigned tone subsets, which may be transmitted by transmitter 904 to a base station. The base station may then provide a timing control command to wireless terminal 900. Upon receipt of the timing control command by receiver 902, processor 906 may implement a timing control routine 958 that evaluates the timing control command and adjusts the transmission time of the wireless terminal to synchronize the terminal with the base station.

The processor 906, e.g., a CPU controls the operation of the wireless terminal 900 and implements methods of the present invention by executing routines 920 and using data/information 922 in memory 908. Data/information 922 includes user data 934, and user information 936. User data 934 may include data, intended for a peer node, which will be routed to encoder 914 for encoding prior to transmission by transmitter 904 to base station 706, and data received from the base station 706 which has been processed by the decoder 912 in receiver 902. User information 936 includes uplink channel information 938, downlink channel information 940, terminal ID information 942, base station ID information 944, sector ID information 946, and mode information 948. Uplink channel information 938 includes information identifying uplink channels segments that have been assigned by base station 706 for wireless terminal 900 to use when transmitting to the base station 706. Uplink channels may include uplink traffic channels, dedicated uplink control channels, e.g., request channels, power control channels and timing control channels. Each uplink channel include one or more logic tones, each logical tone following an uplink tone hopping sequence in accordance with the present invention. The uplink hopping sequences are different between each sector type of a cell and between adjacent cells. Downlink channel information 940 includes information identifying downlink channel segments that have been assigned by base station 706 to WT 900 for use when BS 706 is transmitting data/information to WT 900. Downlink channels may include downlink traffic channels and assignment channels, each downlink channel including one or more logical tone, each logical tone following a downlink hopping sequence, which is synchronized between each sector of the cell.

User info 936 also includes terminal ID information 942, which is a base station 706 assigned identification, base station ID information 944 which identifies the specific base station 706 that WT has established communications with, and sector ID info 946 which identifies the specific sector of the cell where WT 900 is presently located. Base station ID 944 provides a cell slope value and sector ID info 946 provides a sector index type; the cell slope value and sector index type may be used to derive the uplink tone hopping sequences in accordance with the invention. Mode information 948 also included in user info 936 identifies whether the WT 900 is in sleep mode, hold mode, or on mode.

Routines 920 include communications routines 924 and wireless terminal control routines 926. Communications routines 924 control the various communications protocols used by WT 900. Wireless terminal control routines 926 controls basic wireless terminal 900 functionality including the control of the receiver 902 and transmitter 904. Wireless terminal control routines 926 include an allocation of tone subsets and transmission time period routine 930 for the strip-symbol periods. Allocation of tone subsets and transmission time period routine 930 uses user data/info 922 including downlink channel information 940, and base station ID info 944, e.g., slope index and sector type in order to generate the downlink tone subset allocation sequences in accordance with the present invention and process received data transmitted from base station 706. Allocation of tone subsets and transmission time period routine 930, when executed by processor 906, is used to determine when and on which tones the wireless terminal 900 is to receive one or more strip-symbol signals from the base station 706. The uplink allocation of tone subsets and transmission time period routine 930 uses a tone subset allocation function, implemented in accordance with the present invention, along with information received from the base station 706, to determine the tones in which it should transmit on.

Figure 10:
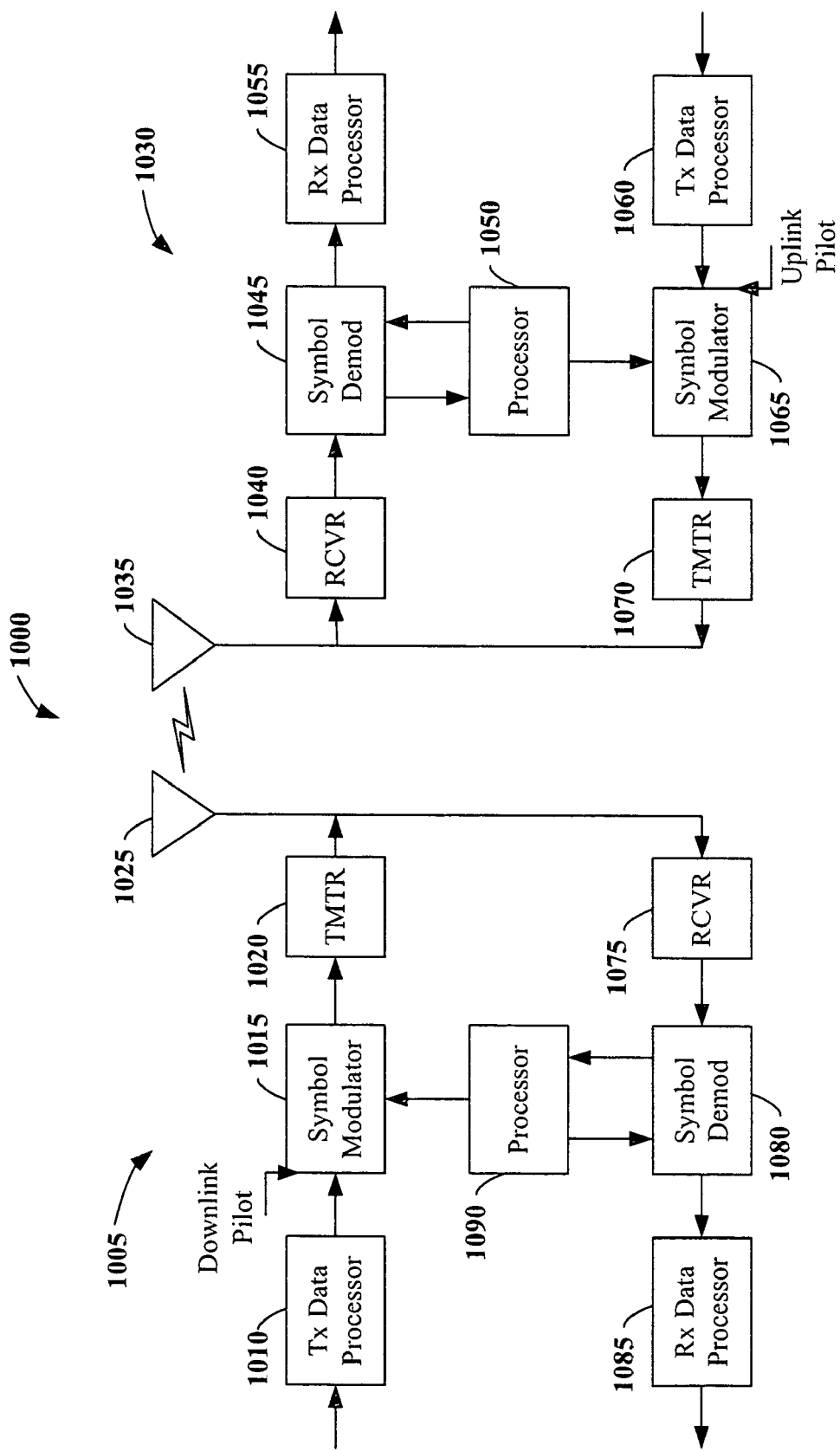
FIG. 10 is an illustration of a wireless communication environment that can be employed in conjunction with the various systems and methods described herein.

FIG. 10 shows an example wireless communication system 1000. The wireless communication system 1000 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. Symbol modulator 1015 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the user devices. At user device 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (e.g., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from user device 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by user device 1030. A processor 1090 performs channel estimation for each active user device transmitting on the uplink. Multiple user devices may transmit pilot concurrently on the uplink on their respective assigned sets of pilot subcarriers, where the pilot subcarrier sets may be interlaced.

Processors 1090 and 1050 direct (e.g., control, coordinate, manage, etc.) operation at access point 1005 and user device 1030, respectively. Respective processors 1090 and 1050 can be associated with memory units (not shown) that store program codes and data. Processors 1090 and 1050 can utilize any of the methodologies described herein. Respective Processors 1090 and 1050 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a wireless terminal in a wireless communication environment, comprising:
   receiving a downlink signal from a base station;
   determining downlink signal timing information from the received signal;
   determining an uplink transmission time for an access request signal as a function of the determined downlink timing information;
   transmitting a first set of tones during a first time period of an access request interval; and
   transmitting a second set of tones during a second time period of said access request interval, said first set of tones being different from said second said of tones, wherein the beginnings of the first time period and the second time period are different and are a function of the determined uplink transmission time.

2. The method of claim 1, wherein the second time period follows immediately the first time period.

3. The method of claim 2, wherein the first and the second tone sets are disjoint.

4. The method of claim 1, wherein each of the first and second time periods has a duration of approximately two symbol periods, said first and second time periods having a combined duration which is less than half the duration of said access request interval.

5. The method of claim 1, wherein a complete request waveform is communicated using said first set of tones during said first time period and another complete request waveform is communicated using said second set of tones in said second time period thereby providing the base station two opportunities during said access request interval to receive the complete request waveform from said wireless terminal wherein.

6. The method of claim 2, wherein each of the first set of tones and the second set of tones comprises contiguous tones.

7. The method of claim 6, wherein the number of tones in each of the first and the second tone sets is between 8 and 32.

8. The method of claim 6, wherein the second set of tones is determined by the first set of tones according to a predetermined function.

9. The method of claim 8, further comprising refraining from transmitting a signal during a third time period, the third time period being immediately subsequent to the second time period.

10. The method of claim 9, wherein the third time period has a duration of at least 4 symbol periods.

11. The method of claim 9, further comprising receiving a response to the access request signal, the response including at least a timing correction command.

12. The method of claim 11, further comprising adjusting the uplink transmission time as a function of the timing correction command and transmitting the signal using the adjusted uplink transmission time.

13. An apparatus that facilitates synchronization of a wireless terminal to a base station, comprising:
   a receiver that receives a downlink signal from a base station;
   a processor that evaluates downlink signal timing information in the received signal and identifies an uplink transmission time for an access request signal as a function of the downlink timing information; and
   a transmitter that transmits a first set of tones during a first time period of an access request interval and a second set of tones during a second time period of said access request interval, said first set of tones being different from said second said of tones, wherein the beginnings of the first time period and the second time period are different and are a function of the determined uplink transmission time.

14. The apparatus of claim 13, wherein the second time period immediately follows the first time period.

15. The apparatus of claim 14, wherein the first and the second tone sets are disjoint.

16. The apparatus of claim 13, wherein each of the first and second time periods has a duration of approximately two symbol periods, said first and second time periods having a combined duration which is less than half the duration of said access request interval.

17. The apparatus of claim 13, wherein a complete request waveform is communicated using said first set of tones during said first time period and another complete request waveform is communicated using said second set of tones in said second time period thereby providing the base station two opportunities during said access request interval to receive the complete request waveform from said wireless terminal.

18. The apparatus of claim 13, wherein the first set of tones comprises contiguous tones and the second set of tones comprises contiguous tones.

19. The apparatus of claim 18, wherein the number of tones in each of the first and the second tone sets is between 8 and 32.

20. The apparatus of claim 18, wherein the second set of tones is determined, by the first set of tones according to a predetermined function.

21. The apparatus of claim 19, wherein the transmitter does not transmit a signal during a third time period, which is immediately subsequent to the second time period.

22. The apparatus of claim 21, wherein the third time period has a duration of at least 4 symbol periods.

23. The apparatus of claim 21, wherein the receiver listens for a response to the access request signal during the third time period, the response including at least a timing correction command.

24. The apparatus of claim 20, further comprising adjusting the uplink transmission time as a function of the timing correction command and transmitting the signal using the adjusted uplink transmission time.

25. An apparatus for use in a wireless communication environment, comprising:
   means for receiving a downlink signal from a base station;
   means for determining downlink signal timing information from the received signal;
   means for determining an uplink transmission time for an access request signal as a function of the determined downlink timing information;
   means for transmitting a first set of tones during a first time period of an access request interval; and
   means for transmitting a second set of tones during a second time period of said access request interval, said first set of tones being different from said second said of tones, wherein the beginnings of the first time period and the second time period are different and are a function of the determined uplink transmission time.

26. The apparatus of claim 25, wherein the second time period follows immediately the first time period.

27. The apparatus of claim 26, wherein the first and the second tone sets are disjoint.

28. The apparatus of claim 25, wherein each of the first and second time periods has a duration of approximately two symbol periods, said first and second time periods having a combined duration which is less than half the duration of said access request interval.

29. The apparatus of claim 25, wherein a complete request waveform is communicated using said first set of tones during said first time period and another complete request waveform is communicated using said second set of tones in said second time period thereby providing the base station two opportunities during said access request interval to receive the complete request waveform from said wireless terminal.

30. The apparatus of claim 26, wherein each of the first set of tones and the second set of tones comprises contiguous tones.

31. The apparatus of claim 30, wherein the number of tones in each of the first and the second tone sets is between 8 and 32.

32. The apparatus of claim 30, wherein the second set of tones is determined by the first set of tones according to a predetermined function.

33. The apparatus of claim 32, wherein the means for transmitting refrains from transmitting a signal during a third time period, the third time period being immediately subsequent to the second time period.

34. The apparatus of claim 33, wherein the third time period has a duration of at least 4 symbol periods.

35. The apparatus of claim 33, wherein the means for receiving receives a response to the access request signal, the response including at least a timing correction command.

36. The apparatus of claim 35, further comprising means for adjusting the uplink transmission time as a function of the timing correction command and transmitting the signal using the adjusted uplink transmission time.

37. A computer-readable medium having stored thereon computer-readable instructions for controlling a wireless terminal, the computer-readable medium comprising:
   instructions for causing said wireless terminal to receive a downlink signal from a base station;
   instructions for causing said wireless terminal to determine downlink signal timing information from the received signal;
   instructions for causing said wireless terminal to determine an uplink transmission time for an access request signal as a function of the determined downlink timing information;
   instructions for causing said wireless terminal to transmit a first set of tones during a first time period of an access request interval; and
   instructions for causing said wireless terminal to transmit a second set of tones during a second time period of said access request interval, said first set of tones being different from said second said of tones, wherein the beginnings of the first time period and the second time period are different and are a function of the determined uplink transmission time.

38. The computer-readable medium of claim 37, wherein the second time period follows immediately the first time period.

39. The computer-readable medium of claim 38, wherein the first and the second tone sets are disjoint.

40. The computer-readable medium of claim 37, wherein each of the first and second time periods has a duration of approximately two symbol periods, said first and second time periods having a combined duration which is less than half the duration of said access request interval.

41. The computer-readable medium of claim 37, wherein a complete request waveform is communicated using said first set of tones during said first time period and another complete request waveform is communicated using said second set of tones in said second time period thereby providing the base station two opportunities during said access request interval to receive the complete request waveform from said wireless terminal.

42. The computer-readable medium of claim 38, wherein each of the first set of tones and the second set of tones comprises contiguous tones.

43. The computer-readable medium of claim 42, wherein each of the first and the second tone sets has a number of tones ranging from 8 to 32 tones.

44. The computer-readable medium of claim 42, further comprising instructions for causing the wireless terminal to determine the second set of tones based on the first set of tones according to a predetermined function.

45. The computer-readable medium of claim 44, further comprising instructions for causing the wireless terminal to refrain from transmitting a signal during a third time period, the third time period being immediately subsequent to the second time period.

46. The computer-readable medium of claim 45, wherein the third time period has a duration of at least 4 symbol periods.

47. The computer-readable medium of claim 45, further comprising instructions for causing the wireless terminal to receive a response to the access request signal, the response including at least a timing correction command.

48. The computer-readable medium of claim 47, further comprising instructions for causing the wireless terminal to adjust the uplink transmission time as a function of the timing correction command and transmitting the signal using the adjusted uplink transmission time.

49. A processor that executes instructions for controlling a communications device in a wireless communication environment to:
receive a downlink signal from a base station;
determine downlink signal timing information from the received signal;
determine an uplink transmission time for an access request signal as a function of the determined downlink timing information;
transmit a first set of tones during a first time period of an access request interval; and
transmit a second set of tones during a second time period of said access request interval, said first set of tones being different from said second said of tones, wherein the beginnings of the first time period and the second time period are different and are a function of the determined uplink transmission time.

50. The processor of claim 49, wherein the second time period is immediately subsequent to the first time period.

51. The processor of claim 50, wherein the first and the second tone sets are disjoint.

52. The processor of claim 49, wherein each of the first and second time periods has a duration of approximately two symbol periods, said first and second time periods having a combined duration which is less than half the duration of said access request interval.

53. The processor of claim 49 wherein a complete request waveform is communicated using said first set of tones during said first time period and another complete request waveform is communicated using said second set of tones in said second time period thereby providing the base station two opportunities during said access request interval to receive the complete request waveform from said wireless terminal.

54. The processor of claim 50, wherein each of the first set of tones and the second set of tones comprises contiguous tones.

55. The processor of claim 54, wherein each of the first and the second tone sets has a number of tones ranging from 8 to 32 tones.

56. The processor of claim 54, further comprising instructions for determining the second set of tones based on the first set of tones according to a predetermined function.

57. The processor of claim 56, wherein the processor is further configured to control the communications device to refrain from transmitting a signal during a third time period, the third time period being immediately subsequent to the second time period.

58. The processor of claim 57, wherein the third time period has a duration of at least 4 symbol periods.

59. The processor of claim 57, wherein the processor is further configured to control the communications device to receive a response to the access request signal, the response including at least a timing correction command.

60. The processor of claim 59, wherein the processor is further configured to control the communications device to adjust the uplink transmission time as a function of the timing correction command and transmitting the signal using the adjusted uplink transmission time.

61. A method of operating a base station to provide channel access to a wireless terminal in a wireless communication environment, comprising:
receiving a first set of tones and a second set of tones from said wireless terminal during first and second time periods of a channel acquisition time interval, respectively, said first set of tones being different from said second said of tones and said first and second time periods being different;
performing a fast-Fourier transform protocol on each received tone set to demodulate a complete access request waveform for each tone set; and
transmitting a signal granting access to one or more requested channels.

62. The method of claim 61, further comprising performing the FFT protocol during a first five symbols of the channel acquisition time period and transmitting the signal granting access during a last four symbols of the acquisition time period.

* * * * *